United States Patent
Jackson et al.

(10) Patent No.: US 9,813,644 B1
(45) Date of Patent: Nov. 7, 2017

(54) NANO-ANTENNA ARRAY INFRARED IMAGER

(71) Applicant: LOCKHEED MARTIN CORPORATION, Bethesda, MD (US)

(72) Inventors: Paul E. Jackson, Longwood, FL (US); Clara R. Baleine, Orlando, FL (US); Christopher P. Voita, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 307 days.

(21) Appl. No.: 14/744,779

(22) Filed: Jun. 19, 2015

Related U.S. Application Data

(60) Provisional application No. 62/014,314, filed on Jun. 19, 2014.

(51) Int. Cl.
*G01J 1/04* (2006.01)
*H04N 5/33* (2006.01)
(Continued)

(52) U.S. Cl.
CPC .............. *H04N 5/33* (2013.01); *G01J 1/0407* (2013.01); *G01J 1/0448* (2013.01);
(Continued)

(58) Field of Classification Search
CPC ... G01J 1/0407; G01J 1/0448; G01J 2001/448
(Continued)

(56) References Cited

U.S. PATENT DOCUMENTS

| 3,912,557 A | 10/1975 | Hochberg |
| 4,386,505 A | 6/1983 | Little |

(Continued)

FOREIGN PATENT DOCUMENTS

| EP | 0 337 802 | 10/1989 |
| WO | 2013016224 | 1/2013 |

OTHER PUBLICATIONS

Baine et al., "Thermal vias for SOI Technology," Proc ICCCD International Conference on Communications, Computers and Devices, Kharagpur, India, 2000, p. 239-242.
(Continued)

*Primary Examiner* — David Porta
*Assistant Examiner* — Carolyn Igyarto
(74) *Attorney, Agent, or Firm* — Terry M. Sanks, Esq.; Beusse Wolter Sanks & Maire, PLLC

(57) ABSTRACT

An infrared imager includes a first optical component, a second optical component, and at least one thin film dielectric layer. The first optical component has multiple first parallel conductors with a first spacing pattern, aligned in a plane perpendicular to an axis. The second optical component has multiple second parallel conductors with a second spacing pattern, aligned in a plane perpendicular to the axis, angularly offset from the first direction. The thin film dielectric layer includes a refractive index change (RIC) material disposed between and in contact with the first and second parallel conductors. The first optical component, second optical component, and at least one thin film dielectric layer form an antenna array configured to detect one or more predetermined infrared wavelengths based on at least one of the first spacing pattern or the second spacing pattern or the angular offset.

20 Claims, 10 Drawing Sheets

(51) Int. Cl.
  *G01J 1/42* (2006.01)
  *G01J 1/44* (2006.01)
(52) U.S. Cl.
  CPC .............. *G01J 1/4228* (2013.01); *G01J 1/44* (2013.01); *G01J 2001/448* (2013.01)
(58) Field of Classification Search
  USPC ...................... 250/349, 339.02, 339.14, 393
  See application file for complete search history.

(56) References Cited

U.S. PATENT DOCUMENTS

| | | | |
|---|---|---|---|
| 4,392,362 | A | 7/1983 | Little |
| 4,489,570 | A | 12/1984 | Little |
| 5,239,200 | A | 8/1993 | Messina et al. |
| 5,611,214 | A | 3/1997 | Wegeng et al. |
| 5,974,808 | A | 11/1999 | Mangano et al. |
| 6,213,194 | B1 | 4/2001 | Chrysler et al. |
| 8,141,556 | B2 | 3/2012 | Ruben |
| 2007/0209371 | A1 | 9/2007 | Sobel |
| 2007/0245749 | A1 | 10/2007 | Atkins et al. |
| 2009/0073066 | A1* | 3/2009 | Jordon .................. H01Q 13/10 343/770 |
| 2009/0193817 | A1 | 8/2009 | Germain et al. |
| 2010/0283854 | A1 | 11/2010 | McKaughan et al. |
| 2012/0309127 | A1 | 12/2012 | Farooq et al. |

OTHER PUBLICATIONS

Pope et al., "Development of a Two-Stage Alternate Joule-Thomson Cryo-Cooler for AAWS-M Risk Reduction," No. AMSMI-TR-RD-AS-91-22. Army Missile Command Redstone Arsenal AL Advanced Sensors Directorate, 1991, p. 1-22.
Little et al., "Microminiature refrigeration," AIP Conference Proceedings. vol. 985. No. 1. 2008.
Chorowski et al., "Development and Testing of a Miniature Joule-Thomson Refrigerator with Sintered Powder Heat Exchanger," Advances in Cryogenic Engineering, Springer US, 1994, p. 1475-1481.
Lyon et al., "Linear Thermal Expansion Measurements on Silicon from 6 to 340 K," Journal of Applied Physics 48.3, 1977, p. 865-868.
McConnell et al., "Thermal Conductivity of Doped Polysilicon Layers," Microelectromechanical Systems, Journal of 10.3, 2001 p. 360-369.
Kumar et al., "Some Studies on Manufacturing and Assembly Aspects of Miniature J-T Coolers with Specific Regard to the Performance for Small Heat Loads," IJEST, Jan. 2011, pp. 660-664, vol. 3, No. 1, Metcalfe House Delhi, India.
Tzabar et al., "Development of a Miniature Fast Cool Down J-T Cryocooler," J-T and Sorption Cryocooler Developments, 2011, pp. 473-480, Int'l Cryocooler Conference, Inc., Boulder, CO.
Zhu et al., "A Planar Glass/SI Micromachining Process for the Heat Exchanger in a J-T Cryosurgical Probe," Dept. of Mech. Engineering, Feb. 2008, Madison, WI.
Li et al., "Highly Tunable Ultra-Narrow-resonances with Optical Nano-Antenna Phased Arrays in the Infrared." Plasmonics, 2014, pp. 1-7, Plasmonics: Metallic Nanostructures and The Optical Properties XII.
Michel et al., "Reversible Optical Switching of Infrared Antenna Resonances with Ultrathin Phase-Change Layers Using Femtosecond Laser Pulses" ACS Photonics, 2014, pp. 833-839, ACS Publications.
Nature Photonics, "Research Highlights," Macmillan Publishers Limited, 2014, vol. 8.

* cited by examiner

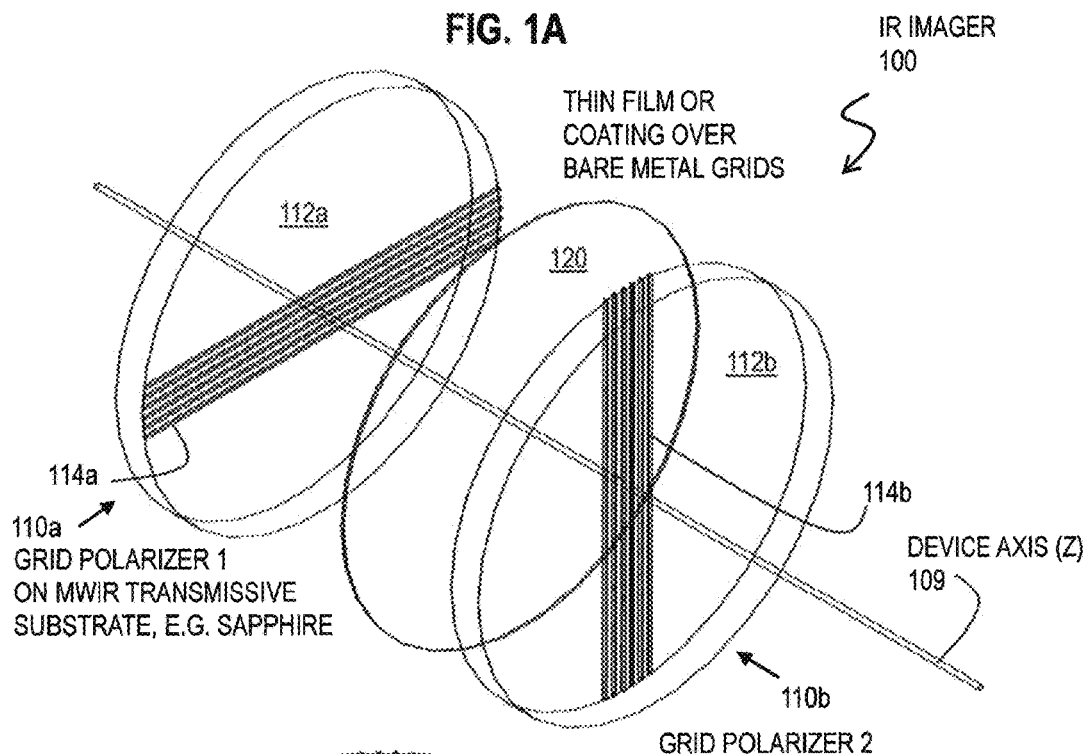
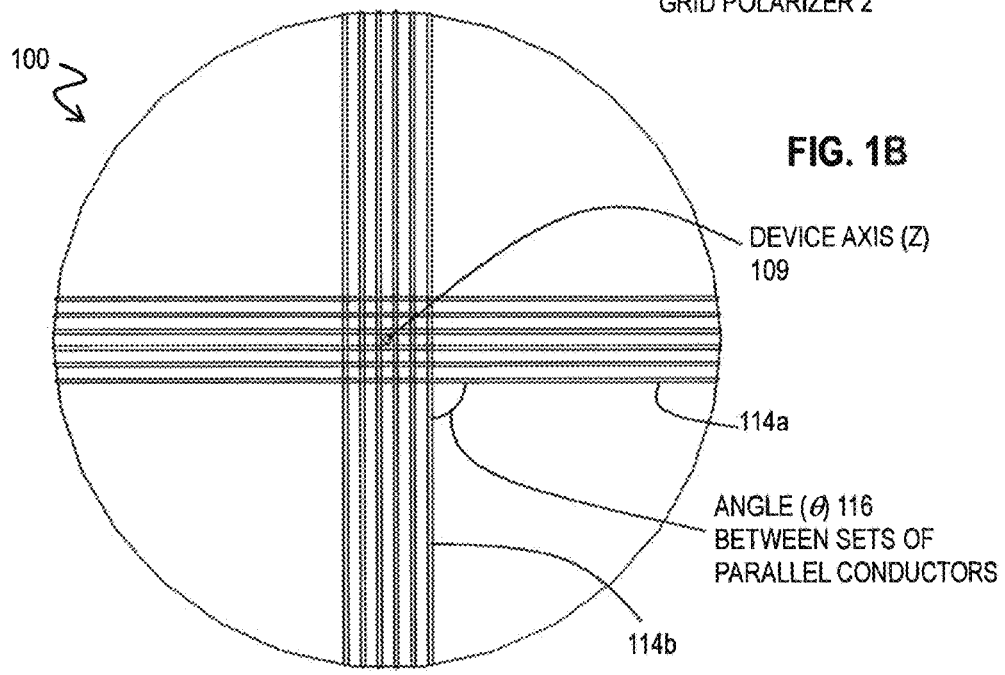

ARRAY OF λ/4 DIPOLE NANO-ANTENNAS 130

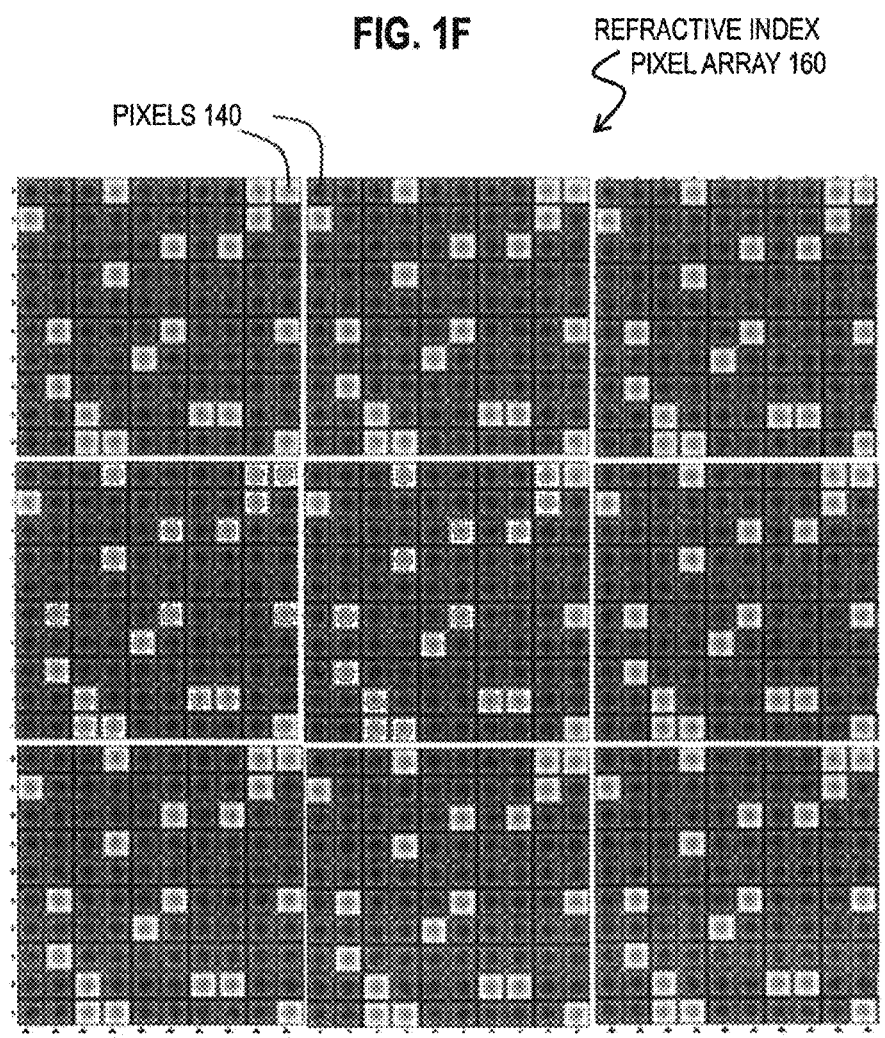

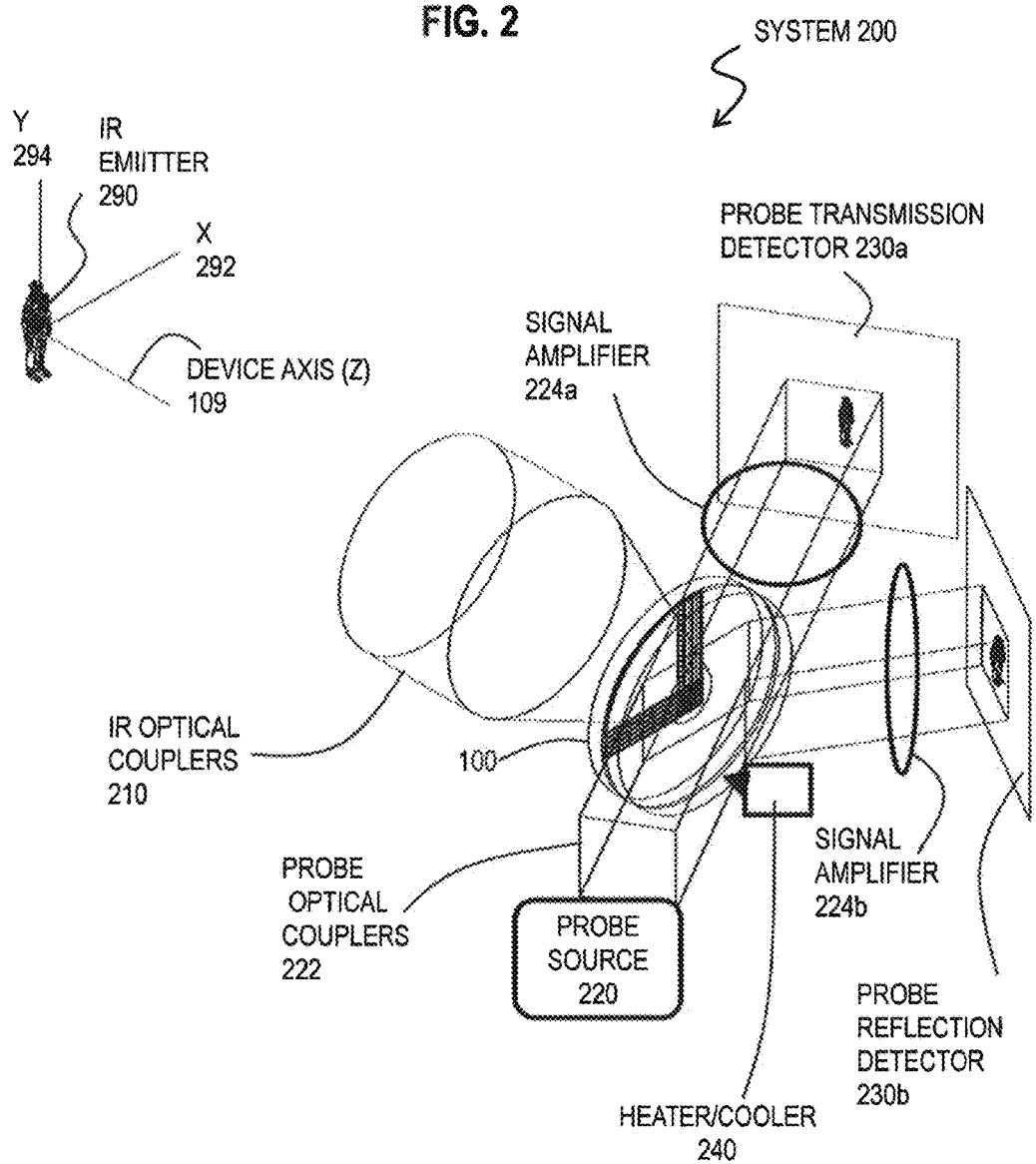

FIG. 4

| Material | Absorption Coeff α (nm⁻¹) | Heat Capacity Cp (J/kgK) | Thermal Conductivity K (W/mK) | Density ρ(g/cm³) |
|---|---|---|---|---|
| VO$_2$(Low Temp) | 0.013 | 644 | 6 | 4.57 |
| VO$_2$(High Temp) | 0.012 | 788 | 3.5 | 4.65 |

FIG. 5

| Crystal | EO coefficient (pmV⁻¹) @ (wavelength in μm) | Index of refraction @ (wavelength in μm) | Index of refraction at 1 THz |
|---|---|---|---|
| ZnTe | $r_{41}$ = 4.04 @ 0.633 | 2.85 @ 0.800 | 3.22 |
| GaP | $r_{41}$ = 0.97 @ 0.633 | 3.24 @ 0.700 | 3.6 |
| LiTaO$_3$ | $r_{13}$ = 8.4<br>$r_{33}$ = 30.5<br>@ 0.980 | $n_o$ = 2.140<br>$n_{eo}$ = 2.144<br>@ 0.980 | $n_o$ = 6.47<br>$n_{eo}$ = 6.15 |
| LiNbO$_3$ | $r_{13}$ = 6.5<br>$r_{33}$ = 30.8<br>$r_{51}$ = 32.6<br>$r_{22}$ = 3.4<br>@ 0.633 | $n_o$ = 2.255<br>$n_{eo}$ = 2.170<br>@ 0.840 | $n_o$ = 6.46<br>$n_{eo}$ = 5.11 |

$n_o$ = ordinary refractive index; $n_{eo}$ = extraordinary refractive index

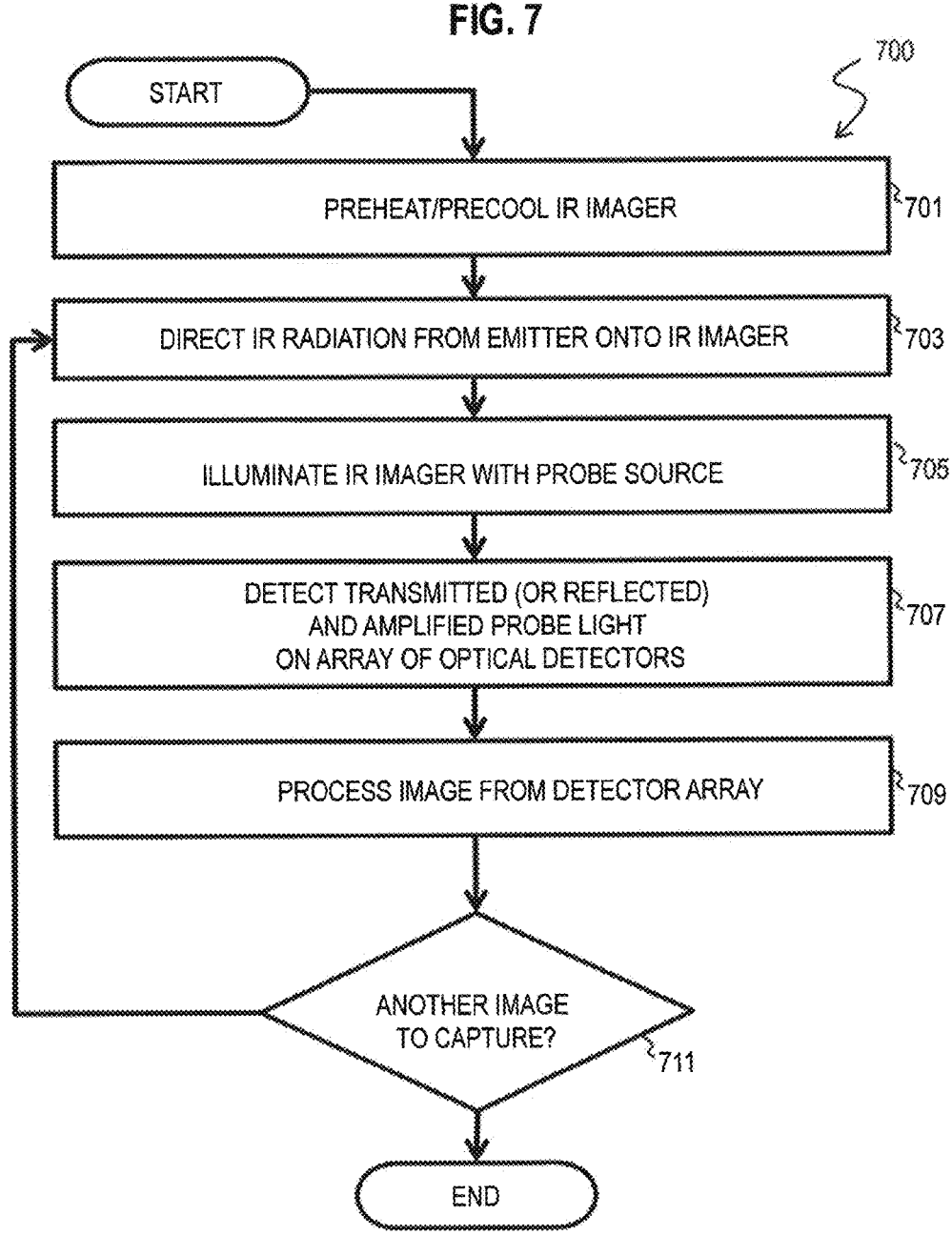

NANO-ANTENNA ARRAY INFRARED IMAGER

CROSS-REFERENCE TO RELATED APPLICATIONS

This application claims benefit of Provisional Application No. 62/014,314, filed Jun. 19, 2014, the entire contents of which are hereby incorporated by reference as if fully set forth herein, under 35 U.S.C. §119(e).

BACKGROUND

[02] There is a need for a mid-wavelength infrared (MWIR) imaging detector that does not require a cryo-cooling for many applications including a covert pointing laser designator application. Some approaches involved cryo-cooled detectors, but the cooling apparatus increases size, weight and cost. Some approaches have used a nano-antenna array coupled to a Read-Out-Integrated-Circuit (ROIC). The ROIC involves specialized design and fabrication that adds substantially to cost of such devices. For covert pointing and other applications, a significant reduction in size, weight, and power, cost (SWAP-C) is desirable in order to make the imager both portable and widely distributed and utilized.

SUMMARY

Embodiments relate to a system and a method for low cost, portable infrared imager, that does not suffer the disadvantages of other devices and systems. As used herein optical refers to visible and near visible light, including the ultraviolet, visible and infrared. The infrared band includes wavelengths from 0.7 microns (also called micrometers, µm, 1 µm=$10^{-6}$ meters) to 12 microns. The mid-wavelength infrared (MWIR) is of special interest in some applications; and has a wavelength range from about 3 microns to about 8 microns. As used here, an array is a co-planar arrangement of one or more array elements in one or two dimensions.

In a set of embodiments, an infrared imager includes a first optical component, a second optical component, and at least one thin film dielectric layer. The first optical component has multiple first parallel conductors with a first spacing pattern. The first parallel conductors are aligned in a plane perpendicular to an axis. The second optical component has multiple second parallel conductors with a second spacing pattern. The second parallel conductors are aligned in a plane perpendicular to the axis. The thin film dielectric layer includes a refractive index change (RIC) material disposed between and in contact with the first parallel conductors and the second parallel conductors. The second spacing pattern is angularly offset from the first spacing pattern by an angular offset. The first optical component, second optical component, and at least one thin film dielectric layer form an antenna array configured to detect one or more predetermined infrared wavelengths based on at least one of the first spacing pattern or the second spacing pattern or the angular offset.

In some embodiments of this set, the thin film dielectric layer includes vanadium dioxide ($VO_2$). The $VO_2$ heats in response to a voltage difference induced across the thin film dielectric layer at each antenna of the antenna array. Above a temperature near 68 degrees Celsius, the crystalline structure of the $VO_2$ changes which causes the complex index of refraction to change. In some of these embodiments, the apparatus includes a heater or cooler configured to set the temperature of the thin film layer near 68 degrees Celsius.

In other embodiments of this set, the thin film dielectric layer comprises lithium niobate ($LiNbO_3$); and, the complex index of refraction is based on a voltage difference induced across the thin film dielectric layer at each antenna of the antenna array.

In some embodiments of this set, a system includes the apparatus and a source of probe light at an optical wavelength affected by a change in the RIC material. The system includes an optical coupler configured to direct the probe light onto the apparatus. The system also includes an array of optical detectors configured to detect probe light transmitted through or reflected by the apparatus. In some of these embodiments, the system also includes an amplifier disposed between the apparatus and the array of optical detectors. The amplifier is configured to amplify differences between probe light interacting with the RIC material in different phases induced by infrared radiation at the one or more predetermined infrared wavelengths. In some of these embodiments, the RIC material is lithium niobate and the amplifier is a polarization magnifier.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 1A is a block diagram exploded view that illustrates an example infrared (IR) imager apparatus, according to an embodiment;

FIG. 1B is a block diagram that illustrates an end view of the example IR imager, according to an embodiment;

FIG. 1F is a block diagram that illustrates an array of pixels of the example IR imager, according to an embodiment;

FIG. 2 is a block diagram that illustrates an example system using the IR imager, according to an embodiment;

FIG. 4 is a table that illustrates experimentally determined values of properties for example materials for an nano-antenna array, according to various embodiments, FIG. 5 is a table that illustrates values of properties for example RIC materials that respond to optical or electro-optical forcing, according to various embodiments;

FIG. 7 is a flow diagram that illustrates an example method for operating the system, according to an embodiment.

DETAILED DESCRIPTION

Figure 1C:
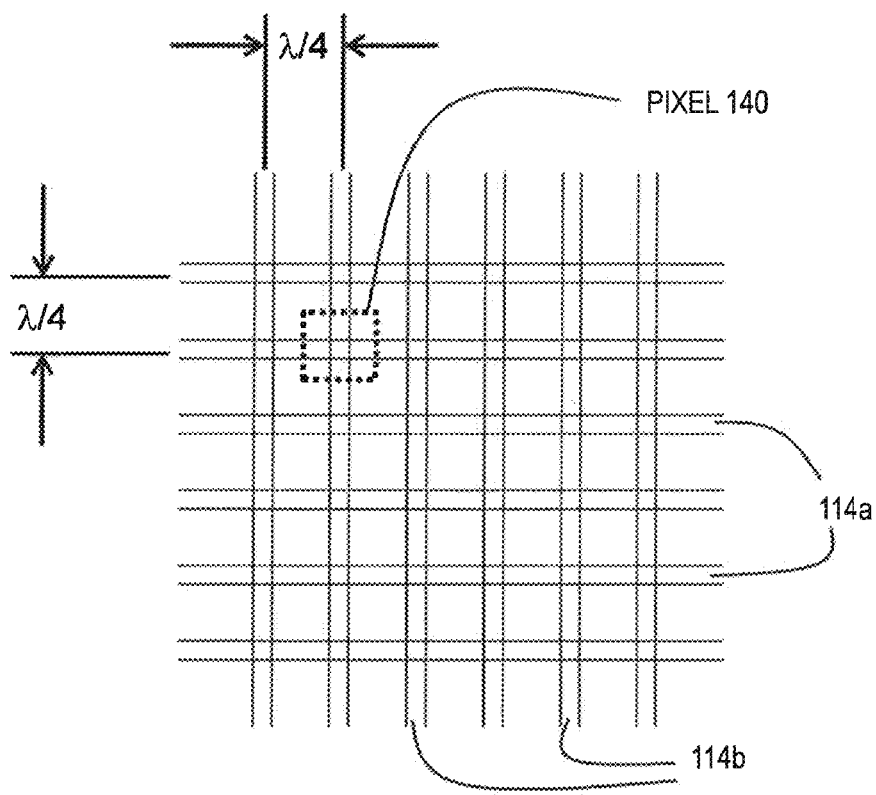
FIG. 1C is a block diagram that illustrates an example nano-antenna array of the IR imager, according to an embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, a thin film layer 120 and a second optical element having second parallel conductors with a second spacing pattern, such as a second off-the-shelf grid polarizer 110b, stacked consecutively in a direction of an optical propagation axis 109 for incident IR radiation. The first optical element may include that is, any and all sub-ranges having a minimum value of equal to or greater than zero and a maximum value of equal to or less than 10, e.g., 1 to 4.

1. OVERVIEW

FIG. 1A is a block diagram exploded view that illustrates a non-limiting example of an infrared (IR) imager 100, according to an embodiment. The imager 100 includes a first optical element, thin film 120, and second optical element. The first optical element includes first parallel conductors with a first spacing pattern, such as a first off-the-shelf grid polarizer 110a of multiple parallel conductors 114a deposed on a surface of an IR transmissive material substrate 112a. The thin film layer 120 is made of a refractive index change (RIC) material that changes one or more optical properties based on optical or electro-optical forcing and is deposited directly in contact with the conductors 114a on substrate 112a. The second optical element includes multiple parallel conductors 114b deposed on a surface of an IR transmissive material substrate 112b. In a non-limiting example, the substrate 112b is made from one or more of different materials such as sapphire, magnesium fluoride, silicon, barium fluoride, germanium, zinc selenide, zinc sulfide, fused silica, cadmium telluride, gallium arsenide, lead fluoride, lithium fluoride, sodium chloride and some polymers. The conductors 114b are on the side of substrate 112b in contact with the thin film layer 120. The conductors may be at a substantial angular offset θ with respect to the direction of the conductors 114a on substrate 112a. In the illustrated embodiment, the angle is about 90 degrees, but in other embodiments, the angle is selected from within a range from 0 to 90 degrees.

FIG. 1B is a block diagram that illustrates an end view of the example IR imager 100, according to an embodiment. The spatial relation is shown among the conductors 114a, 114b and device axis 109 of FIG. 1A. Note that the conductors on one substrate cross the conductors of the other substrate in crossing spots when projected onto a plane perpendicular to the device axis 109. The parallel conductors effectively concentrate energy from radiation with a wavelength about four times the repeat distance (pitch) of the conductors. The space between the conductors is the pitch minus the cross sectional distance (e.g., width) of the conductors. Therefore, the conductors may be spaced with a repeat distance that matches about one fourth the target wavelength. In the MWIR, the target wavelength is in a range from 3 to 8 microns, therefore the pitch of the parallel conductors is in a range from about 0.75 to about 2 microns. In a non-limiting example, a pitch of about 1 micron is used. In other embodiments, the pitch is not constant, but varies, e.g., from 0.75 to about 2 microns, either incrementally or continuously in a gradient arrangement, so as to effectively concentrate energy from multiple IR wavelengths.

FIG. 1C is a block diagram that illustrates a nano-antenna array of the IR imager, according to an embodiment. This shows a constant repeat distance (pitch) of $\lambda/4$, where X is the target wavelength, between corresponding locations on parallel conductors 114a and 114b on both substrates. The crossover spot (also called a cross hatch herein) concentrates energy of the target wavelength between the crossing conductors and is considered one nano-antenna. The number of antennas is equal to the number of cross hatches. Thus each conductor crossing is an antenna in the antenna array. When the scale of the crossing or thickness of the thin dielectric layer is on the nanoscale (about 1 nm to about 1000 nm, 1 nm=$10^{-9}$ meters), then the device is called a nano-antenna array. The enclosed quadrangles provide inductance for the equivalent circuit of the anno-antenna, and the thin film and the crossing conductors provide capacitance for the equivalent circuit. At terahertz (THz, 1 THz=$10^{12}$ Hertz, 1 Hertz=1 cycle per second) frequencies, the conductors provide resistance for the equivalent circuit of the nano-antenna. The thin film layer of RIC material in a pixel 140 in the vicinity of the nano-antenna may be affected by the optical or electro-optical forcing at the nano-antenna.

In some embodiments, the spacing patters for the conductors on the first and second optical components are selected from one of: a constant spacing pattern; a gradient spacing pattern; or a combination of the constant spacing pattern and the gradient spacing pattern. In some embodiments, either or both spacing pattern include multiple different spacing patterns. Each pattern of these different spacing patterns is associated with an area on the corresponding first or second optical component. Each pattern of these different spacing patterns has at least one of a different repeat distance or different conductor width or other configuration difference.

Figure 1D:
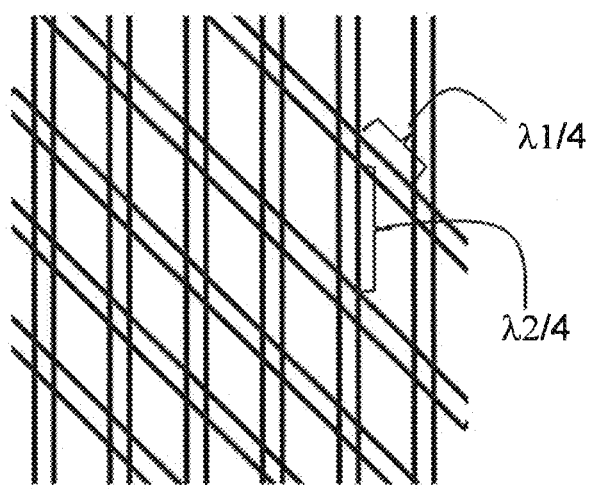
FIG. 1D is a block diagram that illustrates an example nano-antenna array of the IR imager for multiple target wavelengths, according to another embodiment.

FIG. 1D is a block diagram that illustrates an example nano-antenna array of the IR imager for multiple target wavelengths, according to another embodiment. In this embodiment, the pattern of the conductors are at an angular offset of 45 degrees, rather than 90 degrees, and, thus, form parallelograms with different length sides, and thus are responsive to different IR wavelengths, λ1 for the short side with length λ1/4, and λ2 for the long side with length λ2/4. Such an arrangement is expected to impart a responsive signal for a band from about λ1 to about λ2. In some embodiments, the first and second optical components (e.g., grid polarizers 112a and 112b) are configured to rotate with respect to each other so that the angular offset is adjustable. In some embodiments, the spacing between conductors varies from one portion of the array to another to further expand the wavelength band to which the antenna array is responsive.

Figure 1E:
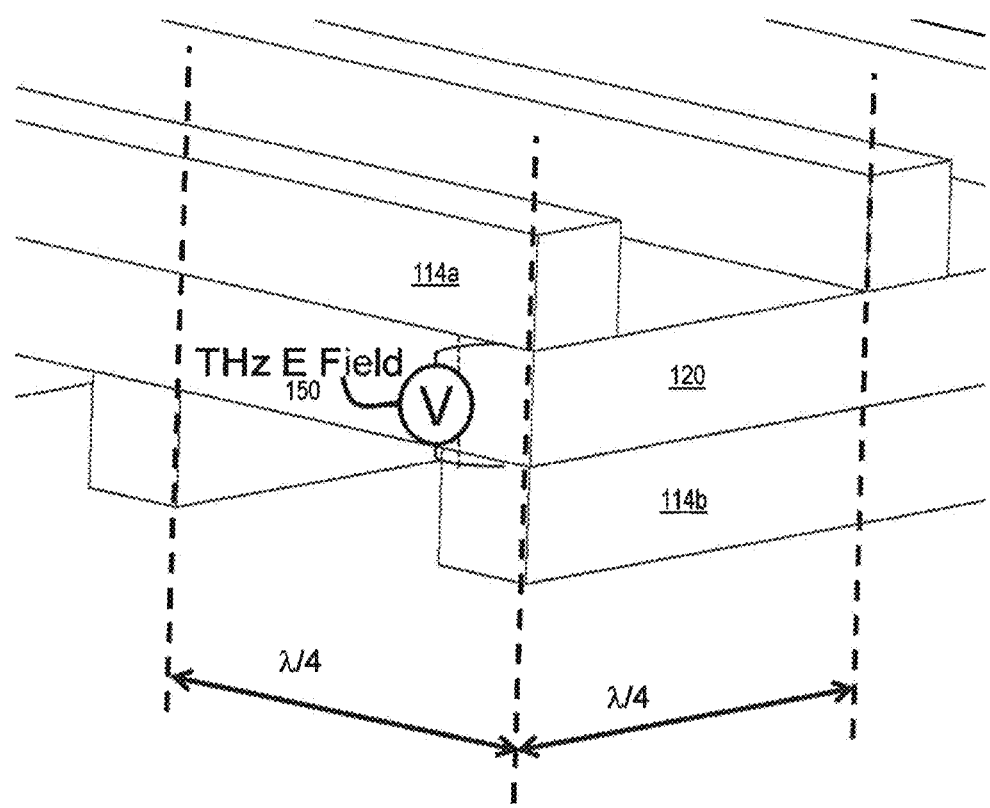
FIG. 1E is a block diagram that illustrates a perspective view of one example nano-antenna, according to an embodiment.

FIG. 1E is a block diagram that illustrates a perspective view of a nano-antenna, according to an embodiment. A conductor 114a from the first set of conductors and a conductor 114b from the second set of conductors are shown along with the portion of the thin film layer 120 between them. Between the crossing conductors 114a and 114b at the crossover spot, a nano-antenna concentrates the electric field of the target wavelength. This electric field has an optical frequency given by the speed of light, c, divided by the wavelength, which is in a range of Terahertz. The self-inductance, stray capacitance and mutual inductance of the conductors create a. THz circuit equivalent to a quarter wavelength transmission line terminated by the impedance of the thin film layer 120 between them. A terahertz (THz) E-field voltage difference V is set up between the two sets of conductors. This voltage difference can, directly or indirectly, change the optical properties, such as the complex index of refraction, N given by Equation 1, of certain RIC materials:

$$N=n+ik \qquad (1)$$

where i is the imaginary unit vector. The real part, n, of the complex refractive index is the index of refraction which indicates the ratio of the speed of light in a vacuum to the speed of light in the material; and the imaginary part gives the extinction coefficient, k, that is the reciprocal of the distance over which the intensity of a beam of light decays to 1/e of the initial intensity, typically expressed in inverse meters ($m^{-1}$) or relative to a standard so as to be dimensionless.

Thus, FIG. 1A through FIG. 1E describe an apparatus with a first substrate layer 112a comprising a first material substantively transparent for infrared radiation at a target wavelength and a first plurality of parallel conductors 114a disposed on the first substrate 112a. The first plurality of conductors are spaced apart with a repeat distance that is about one quarter of the target wavelength λ. A thin film layer 120 of a RIC material has a thickness of sub-micro (nanoscale) to several hundreds of microns or more, and is disposed in contact with the first plurality of parallel conductors 114a. A second substrate layer 112b comprises a second material. In some embodiments, the second material is substantively transparent for infrared radiation at the target wavelength λ. A second plurality of parallel conductors 114b are disposed on the second substrate 112b and are spaced apart with the repeat distance. The second plurality of parallel conductors 114b are in contact with the thin film layer 120 and are oriented at an angular offset θ 116 relative to the first plurality of parallel conductors 114a. A complex index of refraction N of the RIC material in layer 120 is based on a voltage difference V of THz electric field 150 induced across the thin film layer 120 between the first parallel conductors 114a and the second parallel conductors 114b by infrared radiation at the target wavelength λ.

Even more generally, FIG. 1A through FIG. 1E, describe an apparatus that includes a first optical component, a second optical component, and at least one thin film dielectric layer 120. The first optical component has multiple first parallel conductors with a first spacing pattern. The first parallel conductors are aligned in a plane perpendicular to an axis 109. The second optical component has multiple second parallel conductors with a second spacing pattern. The second parallel conductors are aligned in a plane perpendicular to the axis 109. The thin film dielectric layer includes a refractive index change (RIC) material disposed between and in contact with the first parallel conductors and the second parallel conductors. The second spacing pattern is angularly offset from the first spacing pattern by an angular offset. The first optical component, second optical component, and at least one thin film dielectric layer forms an antenna array configured to detect one or more predetermined infrared wavelengths based on at least one of the first spacing pattern and the second spacing pattern and the angular offset, or some combination.

FIG. 1F is a block diagram that illustrates an array 160 of pixels 140 of the example IR imager, according to an embodiment. Each pixel 140 is a portion of the thin film layer 120 that has a complex index of refraction N based, directly or indirectly, on the strength V of the electric field 150 set up between conductors 114a and 114b. The relation between the field strength V and the change in N depends on the RIC material used in the thin film layer 120.

FIG. 2 is a block diagram that illustrates a system 200 using the IR imager 100, according to an embodiment. In the illustrated embodiment, the system 200 may include IR optical couplers 210 configured to direct light from IR emitter 290 (such as animal or human subject or laser or laser spot reflection or heat source) onto the IR imager 100. Although shown for purposes of illustration, the IR emitter 290 is not part of the system 200. The light directed along device axis (z) 109 may be captured by the IR optical couplers 210 and directed to, e.g., focused onto, the IR imager 100. The plane perpendicular to the device axis 09 is defined by x axis 292 and y axis 294.

The IR light impinging on IR imager 100 from various points in the x-y plane causes some pixels of the RIC material in thin film layer 120 to change the optical properties of the RIC material, such as the real or imaginary part of the complex index of refraction, N, or some combination.

The changed optical properties of the pixels may be observed using a probe source 220 of probe light which is directed by probe optical couplers 222 onto the IR imager 100. The transmitted light may be detected by a probe transmission detector array 230a, such as charge coupled device (CCD) array commonly used in digital imaging; or, instead, the reflected light may be detected by a probe reflection detector array 230b, such as a separate CCD array. In some embodiments, both probe transmission detector array 230a and probe reflection detector array 230b are included. In some embodiments, the detector is replaced by an objective lens for direct viewing by a user (not shown).

The signal is the change in the transmitted or reflected probe light due to the changes in the optical properties of the pixels of IR imager 100 due to changes in the intensity of IR light of the target wavelength impinging on each nano-antenna of IR imager 100. In some embodiments, the signal of the transmitted or reflected probe light may be enhanced using signal amplifiers 224a or 224b, respectively. In a non-limiting example, when the changes in N causes changes in the polarization orientation of the reflected light, a polarization magnifier may be used as signal amplifier 224b. Most wavelength up-conversion techniques miss the fact that MWIR has very low contrast and won't couple efficiently to a limited CCD dynamic range. The polarization amplifier will gain-up small signals. In some embodiments, the polarization amplifier is rotated relative to the background DC signal to effectively subtract the MWIR DC pedestal. This approach may solve a common problem with most up-conversion concepts; DC pedestal removal to achieve more efficient coupling to a CCD camera dynamic range.

In some embodiments, the RIC material of the thin film layer 120 may be sufficiently sensitive to changes in the intensity of IR light of the target wavelength impinging on the film, if the film is at or near a phase change temperature. In some such embodiments, a heater or cooler 240 may be included, which is configured to heat or cool the IR imager 100, or layer 120 therein, to the desired operating temperature at or near the phase change temperature, e.g., using one or more thermoelectric devices. Though a cooler may be included in some embodiments, in various preferred embodiments the cooler, if included, is not a cryo-cooler configured to reach temperatures below negative one hundred degrees Celsius, but, instead, is a simple, small and inexpensive cooler designed to drop the temperature of the imager 100 a few to a few tens of degrees.

The optical couplers 210, 222 include one or more components known in the art for directing or focusing optical radiation from a source, including free space, a lens, an optical fiber, a mirror, a beam splitter, a diffraction grating, a filter, and an aperture. In various embodiments, the emitter 290 is a laser, one or more reflected beams from a target, or one or more MWIR light rays from an emitting object, such as a heat source. In some embodiments, the probe source 220 is a laser.

Figure 3:
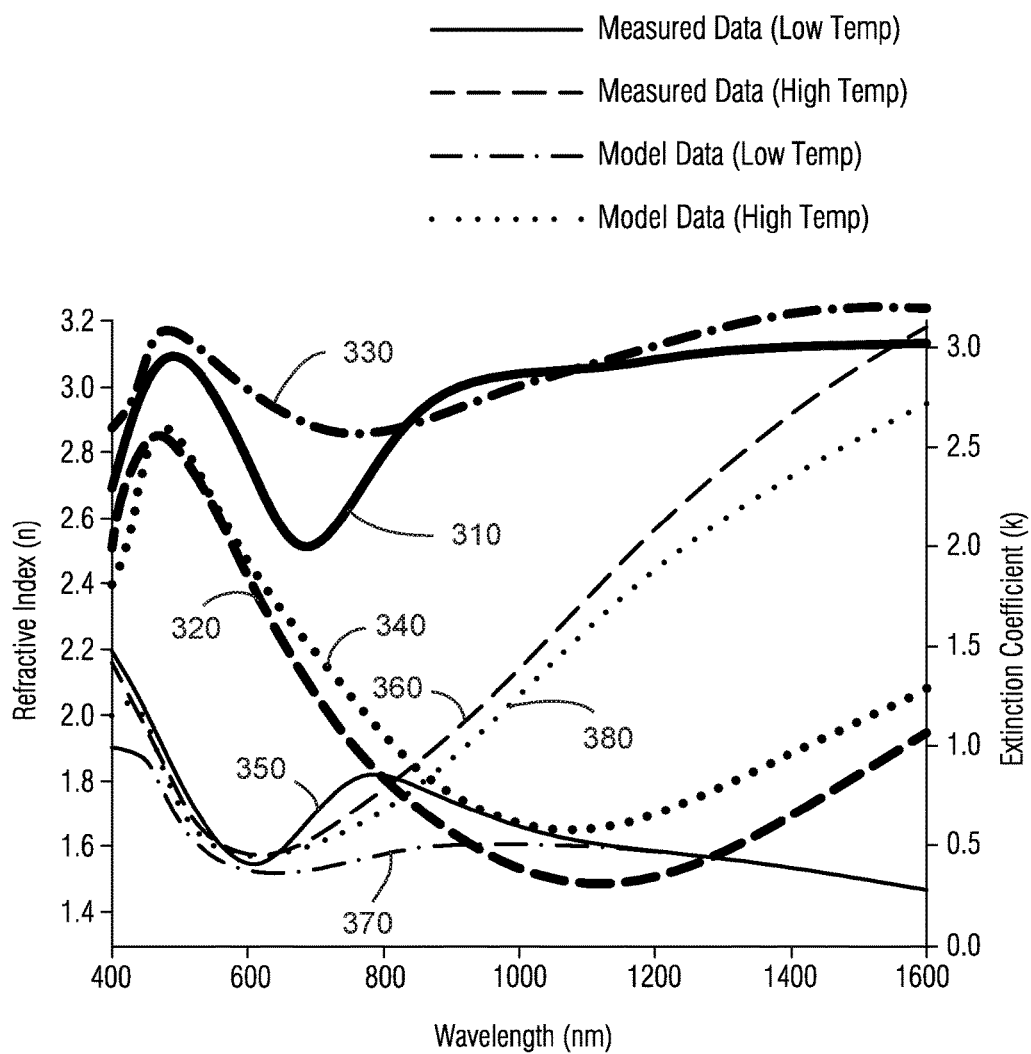
FIG. 3 is a graph that illustrates example dependence of real part refractive index (n) and imaginary part (extinction coefficient, κ) for $VO_2$ on wavelength for the two states, according to an embodiment.

2. VANADIUM DIOXIDE EMBODIMENT $VO_2$ films exhibit extraordinary changes in optical properties between a low-temperature insulating phase and a high-temperature metallic phase. The phase transition temperature is about 68 degrees Celsius. FIG. 3 shows the measured refractive index (n) and extinction coefficient (k) for $VO_2$ compared to model values from HANS W. VERLEUR, A. S. BARKER, JR., and C. N. BERGLUND, *Optical Properties of $VO_2$ between 0.25 and 5 eV*, Rev. Mod. Phys. 40, 737—Published 1 Oct. 1968). The horizontal axis is wavelength in nanometers; the left vertical axis is refractive index n, which is dimensionless. The upper black traces 310, 330 show the refractive index at a low temperature first state, below about 68 degrees Celsius; and the decreasing black traces 320, 340 with wavelength show the refractive index at a high temperature second state, above about 68 degrees Celsius. The right vertical axis is extinction coefficient, which is dimensionless. Two grey traces 350, 370 show the very small values of extinction coefficient at the low temperature first state; and the other grey traces 360, 380 increasing with wavelength show the very large values of the extinction coefficient at the high temperature second state. The large difference in n and k results in a change in the transmission/reflection properties of the structure, showing high transmission in the insulating state (<65° C.) and low transmission in the metallic state (>70° C.).

The thin film layer of $VO_2$ between the crossing conductors may act as a load and absorbs THz current; thus, producing local heating. $VO_2$ can be passively returned to the first state and switching times do not depend on crystallization kinetics (as they do in chalcogenide phase change materials like GeSbTe, GST); but rather they depend on a metal-insulator transition. The stack design may play an important role on the filter performance (e.g. activation threshold, response time and dynamic range). In a non-limiting example, a $VO_2/SiO_2$ stack may retain higher temperatures over time than a $VO_2/Si$ stack, because $SiO_2$ has about 100 times lower thermal conductivity than Si. Thus $SiO_2$ may retain higher temperatures over time; while the Si filter returns to room temperature.

The amount of heating and resulting sensitivity are calculated here for an embodiment. It is assumed that the thin film layer, called hereinafter Thin Film or Coating (TFC), under a crossing spot (called hereinafter a "crosshatch") acts as a load. For a grid polarizer, the separation distance between the wires is less than the wavelength of the radiation, and the wire width is advantageously a small fraction of this distance.

In a non-limiting example, for target wavelength λ=4 microns in the MWIR, a desirable wire separation or repeat distance (pitch) is about 1 micron and the wire width is about 0.25 microns. Assuming a TFC thickness of 0.1 microns, this creates a volume of 0.25×0.25×0.1==0.00625 microns³.

The specific heat formula is given by Equation 2:

$$C = \Delta Q/(m \times \Delta T) \quad (2)$$

where ΔT is temperature change in Kelvin (K), m is the mass in kilograms (kg, 1 kg=$10^3$ grams) of the material changing temperature, and ΔQ is the heat change in joules (J) required to achieve the temperature change ΔT, and C is specific heat of material in J/kgK. For $VO_2$, C is about 700 J/kgK and the density is 4.6 grains (gin) per cubic centimeter (cm, 1 cm=$10^{-2}$ meters). Therefore the volume of 0.00625 microns³ has a mass of 2.875×$10^{-17}$ kg. In a non-limiting example, to change the temperature from room temperature (20° C.) to phase change temperature (68° C.), assuming heat conduction is negligible during the forcing, then involves ΔQ about 1 picoJoule (pJ, 1 pJ=$10^{-12}$ Joules). This implies an IR radiation fluence (energy per unit area) of 1.6 milliJoules (mJ, 1 mJ=$10^{-3}$ joules) per cm² in order to produce an observable signal.

In some embodiments, the $VO_2$ layer is kept near the phase change temperature, e.g., heater or cooler 240 is operated so that the operating temperature is 60° C. In these embodiments, ΔT is only 8° C., one sixth the previous temperature change, which requires only one sixth the fluence to achieve an observable signal. In addition, above 60 C, $VO_2$ is in a region of greater rate of change of the real part index of refraction, n, with temperature (e.g., dn/dT is greater at 60° C. than at 20° C.). This implies that a technique to look as small changes in n can lead to observable signals even if the material does not become absorptive with a complete phase change.

In some embodiments, expected IR fluence is on the order a picoJoule (pJ, 1 pJ=$10^{-12}$) per cm², about five orders of magnitude below what is needed for a complete phase change even at operating temperatures of 60° C. In some embodiments, the operating temperature is moved even closer to 68° C., e.g., to 67° C.

FIG. 4 is a table that illustrates experimentally determined values of properties, such as materials for a nano-antenna array, according to various embodiments. The table of FIG. 4 shows the properties of $VO_2$ at high and low temperature states.

3. LITHIUM NIOBATE EMBODIMENT

FIG. 5 is a table that illustrates values of properties for example RIC materials that respond to optical or electro-optical forcing, according to various embodiments. In electro-optic (EO) materials, the index of refraction can be controlled by changing an electric field across the material. Many materials exhibit a small EO effect including quartz; however, the EO materials with the largest EO effect, which are commonly used in laser based systems, include GaAs, $KH_2PO_4$, $NH_4H_2PO_4$, CdTe, $LiNbO_3$, $LiTaO_3$, and $BaTiO_3$. Lithium Niobate ($LiNbO_3$) has become the most common EO material used for amplitude modulating fiber optic communications systems. The electro-optic coefficient $r_{ij}$ indicates the change in refractive index in direction i from an electric field applied in direction j, and is expressed in FIG. 5 as picometers (pm, 1 pm=$10^{-12}$ meters) per volt (pm $V^{-1}$), for an electric field strength expressed in volts per pm.

The Half-Wave Voltage, $V_{1/2}$, of an EO material provides a measure of the optical phase shift through a unit cube of the material in a specified electrical field. The half-wave voltage is the voltage required for light at a given wavelength to travel an extra one-half wavelength when passing through a unit cube of crystal. The half-wave voltage is usually labeled $V(\pi)$. $V(\pi)$ is also a function of the wavelength of light.

Lithium niobate has a value for $V(\pi)$ of 7 kV at 1 micron wavelength in the infrared and a value of 3.5 kV at 0.50 micron wavelength in the green portion of the visible spectrum. This means that a unit cube of EO material will delay the light passing through it by an extra one-half wavelength when voltage $V(\pi)$ is placed across the cube. For example, 3.5 kV placed across a 10,000 micron cube of Lithium. Niobate will delay 0.50 micron green light an extra one half wavelength (0.25 micron) passing through the 10,000 micron length of the cube.

Practical EO devices are made by reducing the thickness of the EO material between the electrodes where the voltage is applied as thin as possible (with depth D) so that a strong electrical field is produced, and the length (L) of the device material, through which the light passes, as long as possible, both to increase the phase shift. These parameters modify the voltage required for a one half wavelength phase shift as given by Equation 3:

$$V_{1/2}=V(\pi)D/L \qquad (3)$$

Thus, in a non-limiting example, for a D=1,000 micron thick crystal with L=10,000 microns (so D/L=0.1), $V_{1/2}$ is 350 volts which is a practical value for voltages.

As another non-limiting example, in an integrated optical (IO) lithium niobate modulator, D=10 microns and L=10,000 microns. Thus:

$$D/L=10^{-5} \text{ meters}/10^{-2} \text{ meters}=0.001.$$

As a result, $V_{1/2}$=3500×[0.001]=3.5 volts. This also is a suitable voltage for multi-gigabit GaAs transistor drivers to excite integrated EO modulators to produce optical amplitude, phase or pulse modulation. These are the type of modulators being used today in long distance fiber optic telecommunications cables.

Figure 6:
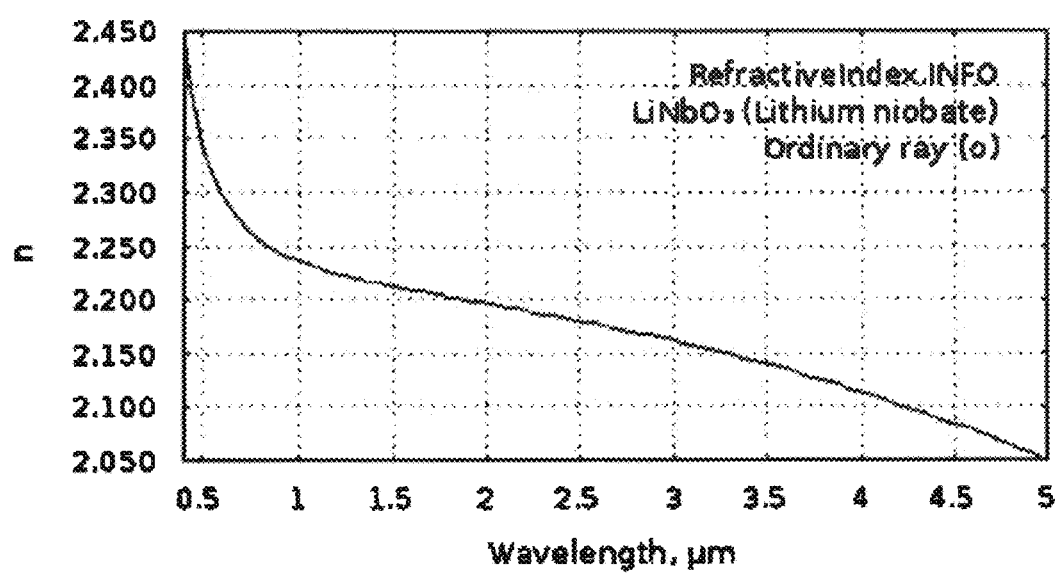
FIG. 6 is a graph that illustrates example dependence of refractive index for lithium niobate on wavelength, according to an embodiment.

FIG. 6 is a graph that illustrates dependence of refractive index for lithium niobate on wavelength, according to an embodiment. The horizontal axis indicates wavelength in microns; and, the vertical axis indicates the real part n of the index of refraction. In a non-limiting example, at λ=4 microns, n=2.1142, dn/dλ=–0.0547 microns$^{-1}$, Vd=18.74 and Ve=18.64. Here Vd and Ve are versions of the Abbe number, also known as the V-number or constringence of a transparent material, which is a measure of the material's dispersion (variation of refractive index with wavelength) in relation to the refractive index, with high values of V indicating low dispersion. Due to the difficulty and inconvenience in producing sodium and hydrogen lines, alternate definitions of the Abbe number are used in some contexts. The value Vd defines the Abbe number with respect to the yellow Fraunhofer d (or D3) helium line at 587.5618 nm wavelength. The value Ve defines the Abbe number with respect to the green mercury E-line at 546.073 nm.

Lithium niobate is used in some embodiments to provide measurable voltage dependent polarization retardation for probe light reflected or transmitted from the IR imager at MWIR wavelengths.

For $LiNbO_3$ the index change Δn produced by an Electric (E)-field is given by Equation 4:

$$\Delta n = n^3 r E/2 \qquad (4)$$

where n is the refractive index, r is the Electro-Optic coefficient and E is the E-field. In a non-limiting example, with a length L=10,000 microns (for example), an index change of Δn=0.2 corresponds to a half-wave optical path length difference of Δn L=2.0 microns. In another non-limiting example, at 4 micron wavelength, n is about 2.1 and r is about 30 picometers (pm, 1 pm=$10^{-12}$ meters) per volt (V). So for an index change Δn of 0.2, the E-field involved is 2×0.2 /[$2.1^3$×30 pm/V]=1,440 MegaVolts (MV, 1 MV=$10^6$ volts) per meter (m), and 144V for 10 microns. It may be possible to discern fractions of the half-wave polarization retardation using the illumination source and "optical reading" technique described. This may be achieved using a thinner layer of $LiNbO_3$ and/or a reduced voltage.

The THz voltage required to effect a significant half-wave and optically readable change in the polarization retardation in $LiNbO_3$ is at about 3-orders of magnitude greater than is provided in some embodiments with an IR return which may only generate millivolts (mV, 1 mV=$10^{-3}$ volts) across the thin film layer.

Magnification of tiny polarization rotations/retardations of less than 1 milliradian (mrad, 1 mrad=$10^3$ radians) is routine in balanced mode polarimetry. In this case a polarization magnifier comprised of a dichroic element such as a plate or stack of Brewster plates is used to attenuate preferentially one of the two orthogonal polarization components from the array of retarded illumination grid pattern elements. In this way the polarization vectors undergo an effective rotation while their overall intensity is reduced. The signal-to-noise ratio is unmodified. The reduced intensity can be compensated by increasing the illumination intensity.

For 1 mrad instead of a half-wave (or it radians) the required $LiNbO_3$ retardation voltage scales linearly and is $10^{-3}/\pi$ less—providing the 3-orders of magnitude increased sensitivity required to create a discernable pixelated image of high contrast for some embodiments.

In practice the dichroic element may be a single thin glass plate with a suitable multi-layer dielectric coating on one side. The plate is placed as signal amplifier 224a or 224b in-between the nano-antenna array 100 and a polarizer in front of the Si CCD imaging camera 230b.

4. OTHER RIC MATERIAL EMBODIMENTS

In other embodiments, other RIC materials are used, alone or in combination. For example, Chalcogenide-based RICs are widely used in modern data storage media for rewritable, non-volatile optical and electronic memory. Materials such as Germanium Antimony (stibium) Tellurium. $Ge_2Sb_2Te_5$ (GST) are designed to undergo reversible amorphous/crystalline phase transitions under optically or electrically induced heating. These RICs have characteristic glass transition temperature Tg and melting temperature Tm typically in the range of about 150° C. and about 600° C., respectively. In the amorphous state, GST has low values for the extinction coefficient, k, and is transmissive, allowing MWIR to LWIR radiation to pass with small loss. In the crystalline state, GST has high values of for k, and blocks radiation in the WMIR to LWIR wavelengths.

An initially amorphous GST thin film layer undergoes the following crystallization sequence: amorphous→face-centered cubic (fcc) crystalline (metastable, Tg=160° C.)→hexagonal close packing (hcp) crystalline (stable structure, Tg=370° C.). By heating the material in the amorphous state to a temperature above Tg, a crystalline form results (e.g., above Tg=160° C. for GST fcc, or above Tg=370° C. for GST hcp). The RICM is said to be SET to the crystalline, blocking state. The crystallized GST film is RESET to amorphous state by heating the film above its melting temperature Tm 307 (e.g., at about 600° C.) and then rapidly cooling (quenching) to below Tg 305 (e.g., 160° C.). The quenching is assisted in some embodiments by cooler 240.

Once the UST film is switched into either the amorphous or crystalline phase, the RIC material in a pixel remains in the same state without applying an external stimulus (e.g., voltage or additional heating/cooling or new incident IR radiation). Therefore, chalcogenide-based imagers are non-volatile Chalcogenide RICs are characterized by their nucleation-dominated or growth-dominated crystallization behavior. In nucleation dominated materials such as GST, the crystallization rate depends on several properties, including the crystallization temperature, crystal nucleation and growth rate, and the incubation time between the start of heating and the formation of crystalline nuclei. The transition from the crystalline to the amorphous phase requires a rapid cooling rate of about $10^{10}$ Kelvin per second (K/s). It has been shown that optically induced amorphous→crystalline→amorphous switching speed of 100 nanometers (nm, 1 nm=$10^{-9}$ meters) diameter features in sub-100 nm thick GST films is less than 20 nanoseconds (ns, 1 ns=$10^{-9}$ seconds) for structures that include metallic heat conducting layers.

Other RIC materials used in some embodiments include Zinc-Cadmium (ZnCd) and Vanadium pentoxide $V_2O_5$ (also called Vanadium oxide).

5. METHOD OF OPERATING

FIG. 7 is a flow diagram that illustrates a method 700 for operating the system 200, according to an embodiment. Although steps are shown as integral blocks in a particular order for purposes of illustration, in other embodiments one or more steps or portions thereof are performed in a different order, or overlapping in time, in series or in parallel, or additional steps are added, or the method is changed in some combination of ways.

In step 701, the imager is preheated or precooled, e.g., to the vicinity of the phase change temperature, e.g., to increase sensitivity. In some embodiments, step 701 is omitted.

In step 703, IR radiation at or near the target wavelength is directed onto the IR imager, e.g., using optical couplers 210. In some embodiments, a laser is used to illuminate a subject that reflects the laser light or fluoresces in the MWIR. In some embodiments, a laser is used to direct IR radiation near the target wavelength onto one or more pixels of the IR imager, e.g., to test or calibrate the IR imager.

In step 705, the IR imager is illuminated with a probe light source to determine the changes in optical properties of IR imager pixels caused by the IR radiation directed onto the imager during step 703. In step 707, the transmitted or reflected probe light is detected on an array of optical detectors. In some embodiments, step 707 includes passing the transmitted or reflected light through a signal amplifier, such as amplifiers 224a or 224b, respectively.

In step 709, the IR image impinging on the IR imager is determined based on the probe light detected in the optical array during step 707.

In step 711, it is determined whether there is another IR image to capture. If not, the process ends. Otherwise control passes back to step 703 to direct more IR radiation onto the IR imager.

6. ALTERNATIVES, EXTENSIONS AND MODIFICATIONS

While embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered. Moreover, unless specifically stated, any use of the terms first, second, etc., does not denote any order or importance, but rather the terms first, second, etc., are used to distinguish one element from another.

7. REFERENCES

D. Chauvat, J. Guéna, Ph. Jacquier, M. Lintz, M.-A. Bouchiat, M. D. Plimmer, C. W. Goodwin, Opt. Commun. 138, 249 (1997).

V. S. Zapasskii, Opt. Spectr. 47, 450 (1979).

We claim:

1. An apparatus comprising:
   a first optical component having a plurality of first parallel conductors with a first spacing pattern, the plurality of first parallel conductors aligned in a plane perpendicular to an axis;
   a second optical component having a plurality of second parallel conductors with a second spacing pattern, the plurality of second parallel conductors aligned in a plane perpendicular to the axis; and
   at least one thin film dielectric layer including a refractive index change (RIC) material disposed between and in contact with the plurality of first parallel conductors and the plurality of second parallel conductors,
   wherein the second spacing pattern is angularly offset from the first spacing pattern by an angular offset, and
   the first optical component and the second optical component and the at least one thin film dielectric layer form an antenna array configured to detect one or more predetermined infrared wavelengths based on at least one of the first spacing pattern and the second spacing pattern and the angular offset.

2. The apparatus of claim 1, wherein at least one of the first spacing pattern or the second spacing pattern is selected from one of: a constant spacing pattern; a gradient spacing pattern; or a combination of the constant spacing pattern and the gradient spacing pattern.

3. The apparatus of claim 1, wherein the first spacing pattern comprises a plurality of spacing patterns wherein: each pattern of the plurality of spacing patterns is associated with an area on the first optical component; and, each pattern of the plurality of spacing patterns has at least one of a different repeat distance or different conductor width.

4. The apparatus of claim 1, wherein the second spacing pattern comprises a plurality of spacing patterns wherein: each pattern of the plurality of spacing patterns is associated with an area on the second optical component; and, each pattern of the plurality of spacing patterns has at least one of a different repeat distance or different conductor width.

5. The apparatus of claim 1, wherein the angular offset is adjustable to tune the antenna array to the one or more predetermined infrared wavelengths.

6. The apparatus of claim 1, wherein the one or more predetermined infrared wavelengths are in a mid-wave infrared (MWIR) wavelength band.

7. The apparatus of claim 1, wherein the first optical component comprises a first substrate layer that is transmissive at the one or more predetermined infrared wavelengths.

8. The apparatus of claim 7, wherein the second optical component comprises a second substrate layer that is transmissive at the one or more predetermined infrared wavelengths.

9. The apparatus of claim 8, wherein the first substrate and the second substrate comprise the same material.

10. The apparatus of claim 9, wherein the first substrate and the second substrate comprise sapphire.

11. The apparatus of claim 1, wherein the thin film dielectric layer has a thickness of less than about one quarter of each of the one or more predetermined infrared wavelengths.

12. The apparatus of claim 1, wherein the angular offset is in a range from greater than zero degrees to about 90 degrees.

13. The apparatus of claim 1, wherein the plurality of first parallel conductors and the plurality of second parallel conductors are both transparent at an optical wavelength used for probing the apparatus.

14. The apparatus of claim 13, wherein the conductors of the plurality of first conductors and the plurality of second conductors comprise a material selected from a group comprising indium tin oxide (ITO) and graphene.

15. The apparatus of claim 1, wherein:
the thin film dielectric layer comprises vanadium dioxide ($VO_2$);
the $VO_2$ heats in response to a voltage difference induced across the thin film dielectric layer at each antenna of the antenna array; and
above a temperature near 68 degrees Celsius, the crystalline structure of the $VO_2$ changes which cause a complex index of refraction of the RIC material to change.

16. The apparatus of claim 15, further comprising a heater or a cooler configured to keep the temperature of the thin film dielectric layer near 68 degrees Celsius.

17. The apparatus of claim 1, wherein:
the thin film dielectric layer comprises lithium niobate ($LiNbO_3$); and
the complex index of refraction is based on a voltage difference induced across the thin film dielectric layer at each antenna of the antenna array.

18. A system comprising:
the apparatus of claim 1;
a source of probe light at an optical wavelength affected by a change in the RIC material;
an optical coupler configured to direct the probe light onto the apparatus of claim 1; and
an array of optical detectors configured to detect probe light transmitted through or reflected by the apparatus of claim 1.

19. The system of claim 18, further comprising an amplifier disposed between the apparatus of claim 1 and the array of optical detectors, wherein the amplifier is configured to amplify differences between probe light interacting with the RIC material in different phases induced by infrared radiation at the one or more predetermined infrared wavelengths.

20. The system of claim 19, wherein:
the RIC material comprises $LiNbO_3$; and
the amplifier is a polarization magnifier.

* * * * *